(12) United States Patent
Gorodyansky

(10) Patent No.: US 9,384,463 B2
(45) Date of Patent: Jul. 5, 2016

(54) SSL HTTPS BROWSER

(75) Inventor: David Gorodyansky, Mountain View, CA (US)

(73) Assignee: Anchorfree, Inc., Menlo Park, CA (US)

( * ) Notice: Subject to any disclaimer, the term of this patent is extended or adjusted under 35 U.S.C. 154(b) by 491 days.

(21) Appl. No.: 13/190,296

(22) Filed: Jul. 25, 2011

(65) Prior Publication Data

US 2012/0022941 A1    Jan. 26, 2012

Related U.S. Application Data

(60) Provisional application No. 61/367,306, filed on Jul. 23, 2010.

(51) Int. Cl.
*G06Q 10/10* (2012.01)
*G06Q 30/02* (2012.01)

(52) U.S. Cl.
CPC ............ *G06Q 10/10* (2013.01); *G06Q 30/0251* (2013.01)

(58) Field of Classification Search
USPC .......................................... 709/226; 319/226
See application file for complete search history.

(56) References Cited

U.S. PATENT DOCUMENTS

| | | | |
|---|---|---|---|
| 2003/0229718 A1* | 12/2003 | Tock et al. | 709/246 |
| 2006/0265283 A1 | 11/2006 | Gorodyansky | |
| 2006/0265501 A1* | 11/2006 | Gorodyansky | 709/226 |
| 2006/0293962 A1 | 12/2006 | Malobrodsky et al. | |
| 2007/0078718 A1* | 4/2007 | Gorodyansky | 705/14 |
| 2008/0155067 A1* | 6/2008 | Rivera | 709/220 |
| 2009/0276314 A1* | 11/2009 | Gorodyansky et al. | 705/14.53 |

* cited by examiner

*Primary Examiner* — Angela Nguyen
(74) *Attorney, Agent, or Firm* — TransPacific Law Group; Pavel I. Pogodin

(57) ABSTRACT

Systems and methods for implementing a web browser which operates to secure all Internet connections of the user using SSL and HTTPS protocols. One implementation is a browser that operates to send all browser navigation commands and send and receive all web traffic through SSL encryption tunnel. In other words, the browser turns all web pages that support only HTTP protocol into HTTPS-enabled web pages. As would be appreciate by those of skill in the art, the use of the SSL and HTTPS secures the user's connection and provides security for user's data. The system may be used to secure email communications, login information for websites, selection of shopping items and all other online activity of the user. All of the above information is encrypted by the inventive system using highly-secure SSL encryption.

21 Claims, 5 Drawing Sheets

SSL HTTPS BROWSER

CROSS-REFERENCE TO RELATED PATENT APPLICATIONS

The present application relies on and claims benefit of priority under 35 U.S.C. 119 from U.S. provisional patent application Ser. No. 61/367,306, filed on Jul. 23, 2010, which is incorporated by reference herein in its entirety.

BACKGROUND OF THE INVENTION

1. Field of the Invention

The present invention relates generally to providing secure Internet experience to users and, more specifically, to a web browser that provides the user with secure web browsing experience.

2. Description of the Related Art

Virtual private networks (VPNs) can be used to provide a layer of security and anonymity to Internet users. Specifically, in a typical configuration, a secure VPN connection is established between a user's terminal 101 and a VPN server/proxy 102, as shown in FIG. 1. According to the conventional VPN protocol, the user terminal 101 sends a request 104 to the VPN server/proxy 102 for the Internet resource 103. The request 104 may be sent via a secure channel, wherein all the transmitted information is encrypted. In response to receiving the request 104, the VPN server/proxy 102 sends a request 105 to the Internet resource 103 requested by the user. However, the VPN server/proxy 102 is configured to mask the information identifying the user terminal 101 from the request 105. Such information that is being masked includes, for example, user's IP address. Upon the receipt of the request 105, the Internet resource 103 provides a response 106 to the VPN server/proxy 102. The VPN server/proxy 102, in turn, forwards (107) this response to the client 101 via a secure channel. Because of the presence of the secure channel 104/107 and the masking of the IP address by the VPN server/proxy 102, the Internet resource 103 or any other Internet entity does not detect any information identifying the client terminal 101, which initiated the request. Thus, user's security and anonymity is achieved.

In accordance with the conventional technique, the operation of the above-described conventional VPN system requires installation of a special VPN client software on the user's terminal 101, which could be a desktop computer, a notebook, or a mobile device. The function of this client is establish a secure communication tunnel with the VPN server on the network and to encrypt and decrypt the respective communications with such VPN server. On the other hand, in many situations, a user using the terminal 101 may not have the ability to install such special VPN software. Specifically, it is possible that the user would not have the appropriate permissions from the system administrator of the terminal platform 101, such as when the terminal 101 is installed at a public location or when the installation of additional software on the terminal 101 is prohibited by a security policy of an organization. In other situations, appropriate VPN client software may simply not be available for the operating system of the terminal 101.

Thus, it is desirable to have a system and method, wherein the user may completely secure his or her Internet browsing experience by means of only a web browser.

SUMMARY OF THE INVENTION

The inventive methodology is directed to methods and systems that substantially obviate one or more of the above and other problems associated with conventional techniques for providing secure Internet experience to users.

In accordance with one aspect of the inventive concept, there is provided a computerized system and associated method, the system incorporating a proxy server operable to enable a user of a user terminal to retrieve at least one Internet resource specified by the user from a content provider; and a secure web server communicatively coupled with the proxy server and operable to establish a secure connection with the user terminal executing a secure web browser, and operable to furnish the retrieved Internet resource to the secure web browser executing on the user terminal via a secure data transmission protocol. In the inventive system, the secure web browser is configured to perform all its web content access operations through the secure web server and the secure data transmission protocol is an HTTPS protocol.

In accordance with another aspect of the inventive concept, there is provided a method for providing a user of a user terminal with a secure Internet experience, the method involving using a secure internet browser to receive from a user information on at least one Internet resource; using a proxy server to enable the user of the user terminal to retrieve the at least one Internet resource specified by the user from a content provider; and using a secure web server communicatively coupled with the proxy server to establish a secure connection with the user terminal executing the secure web browser and to furnish the retrieved Internet resource to the secure web browser executing on the user terminal via a secure data transmission protocol. In the inventive method, the secure web browser is configured to perform all its web content access operations through the secure web server and the secure data transmission protocol is an HTTPS protocol.

In accordance with yet another aspect of the inventive concept, there is provided a computer-readable medium embodying a set of instructions, the instructions, when executed by one or more processors cause the one or more processors to perform a method for providing a user of a user terminal with a secure Internet experience, the method involving: using a secure internet browser to receive from a user information on at least one Internet resource; using a proxy server to enable the user of the user terminal to retrieve the at least one Internet resource specified by the user from a content provider; and using a secure web server communicatively coupled with the proxy server to establish a secure connection with the user terminal executing the secure web browser and to furnish the retrieved Internet resource to the secure web browser executing on the user terminal via a secure data transmission protocol. In said method, the secure web browser is configured to perform all its web content access operations through the secure web server and the secure data transmission protocol is an HTTPS protocol.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the inventive methodology provide systems and methods for implementing a web browser which operates to secure all Internet connections of the user using SSL and HTTPS protocols. In one embodiment of the invention, the inventive technology is a browser that operates to send all browser navigation commands and send and receive all web traffic through SSL encryption tunnel. In other words, the embodiment of the inventive browser turns all web pages that support only HTTP protocol into HTTPS-enabled web pages. As would be appreciate by those of skill in the art, the use of the SSL and HTTPS secures the user's connection and provides security for user's data. In one or more embodiments, the inventive system may be used to secure email communications, login information for websites, selection of shopping items and all other online activity of the user. In an embodiment of the invention, all of the above information is encrypted by the inventive system using highly-secure SSL encryption.

As would be appreciated by persons of skill in the art, the embodiments of the inventive concept create numerous benefits to users, which include, without limitations, protecting the identity of the users, protecting the personal information of the users; and ensuring that all financial information, login information for user's accounts with various web sites as well as content of the emails of the user are properly secured and never compromised.

Figure 1:
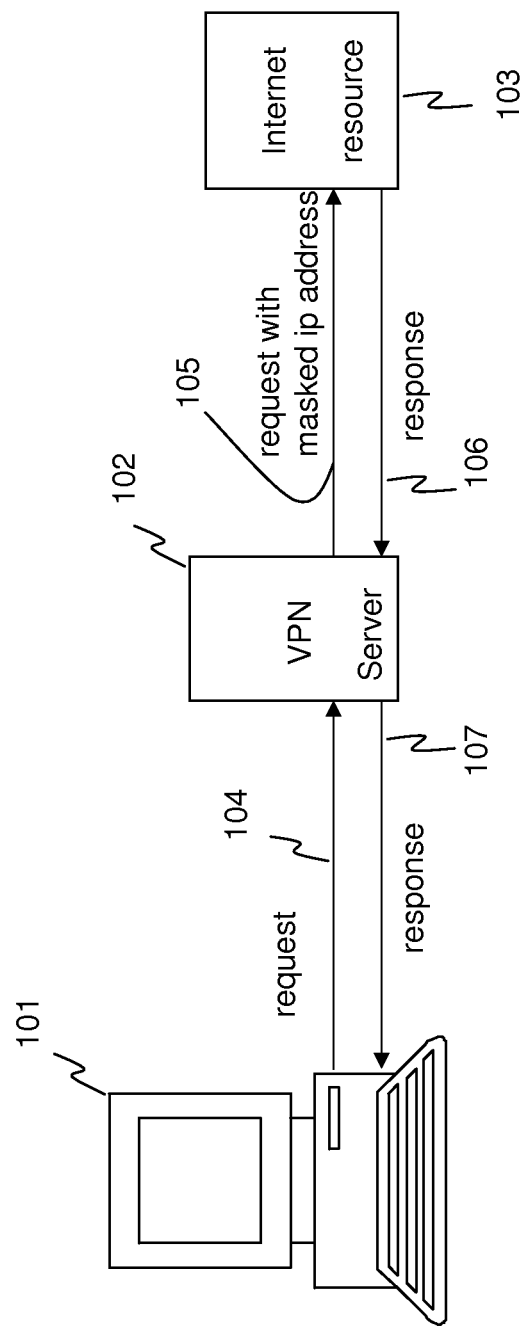
FIG. 1 illustrates a schematic diagram of an exemplary conventional VPN implementation.
Figure 2:
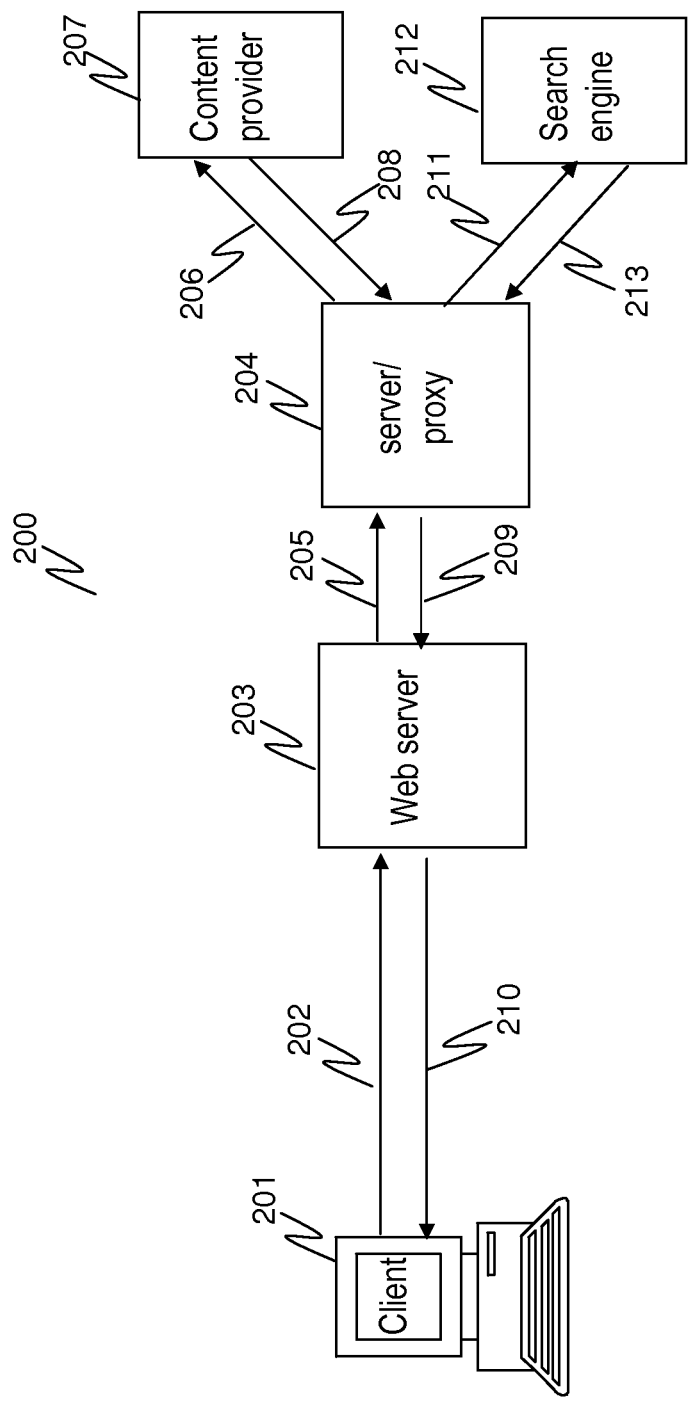
FIG. 2 illustrates an exemplary embodiment of the inventive system for providing a user with secure Internet experience.

FIG. 2 illustrates an exemplary embodiment of the inventive concept. The client terminal 201 executes the inventive browser application (not shown), which displays content requested by the user. The user uses the inventive browser application to input target URLs, issue navigation commands and specify search queries. This information 202, which may include any of the above-specified types of data, is transmitted by the inventive browser application using SSL-encrypted HTTPS protocol to a web server 203, which supports HTTPS and which decrypts the received information and provides it to the inventive server/proxy 204. The VPN server/proxy 204 forwards the received search query to the search engine 212 using HTTP or HTTPS protocol (211) and receives back search results 213 from the search engine 212. The search results are then sent to the web server (209) and subsequently back to the user's terminal (210), where they are displayed to the user using the inventive browser application. The search results 210 are sent by the web server 203 to the client terminal 201 again via secure HTTPS protocol, which utilizes the SSL encryption. The VPN server/proxy 204 also uses URLs specified by the user to send requests (206) for content specified by the user. The content is obtained from a content provider 207. The received content 208 is forwarded to the web server 203 and then back to the user's terminal, where it is displayed to the user by the inventive browser application. Again, the retrieved content is sent back to the client terminal using secure HTTPS protocol.

In one or more embodiments of the invention, the inventive browser application also supports the forward, back and reload web browser navigation commands. These commands operate in a similar manner to corresponding functions of a conventional web browser.

In one or more embodiments of the invention, through the use of the secure connections 202 and 210 to the secure web server 203, the inventive browser application turns all the web traffic to and from the user (client) terminal 201 from the insecure HTTP protocol to the secure HTTPS protocol, both of which are well-known to persons of skill in the art. In an embodiment of the invention, the functions of the VPN client which is used by the user to access the VPN service are entirely performed by the inventive browser application and the user does not need to download or install any specialized software in order to use the private VPN service. It should be also noted that because of the web server 203, which supports HTTPS, operating in conjunction with the inventive server/proxy 204, all pages are provided to the client terminal 201 using the secure HTTPS protocol, including pages that do not support HTTPS. Thus, the user is provided with a completely secure browsing experience.

In order to access the Internet in a secure manner through the secure web server 203 and the inventive server/proxy 204, the inventive secure browser application is configured to appropriately modify the URL of the web resources received from the user. For example, in one embodiment of the invention, the inventive secure browser may append the URL requested by the user to the web (network) address of the secure web server 203 such that the target resource is accessed in a secure manner through the inventive server/proxy 204.

In an embodiment of the invention, the web address(es) of one or more of the web server(s) 203 operating in conjunction with the servers/proxies 204, which are needed to secure the connections to and from the inventive browser application, is(are) coded into the inventive browser application. In another embodiment, the corresponding addresses are input into the inventive browser application by the user. In yet another implementation, the addresses of the server(s) 203 are obtained by the inventive browser application automatically through the network using a discovery procedure.

As it is well-known to persons of skill in the art, Hypertext Transfer Protocol Secure (HTTPS) is a combination of the Hypertext Transfer Protocol (HTTP) with the SSL/TLS protocol to provide encryption and secure identification of the server. HTTPS operates on port 443.

In one embodiment of the invention, the inventive browser application is monetized through advertising materials that are shown to the user using the inventive browser application as described in U.S. patent application Ser. No. 12/796,538 entitled SYSTEM AND METHOD FOR USING WEB BROWSER TO DISPLAY ADVERTISING MATERIALS TO USER and incorporated by reference herein in its entirety.

Figure 3:
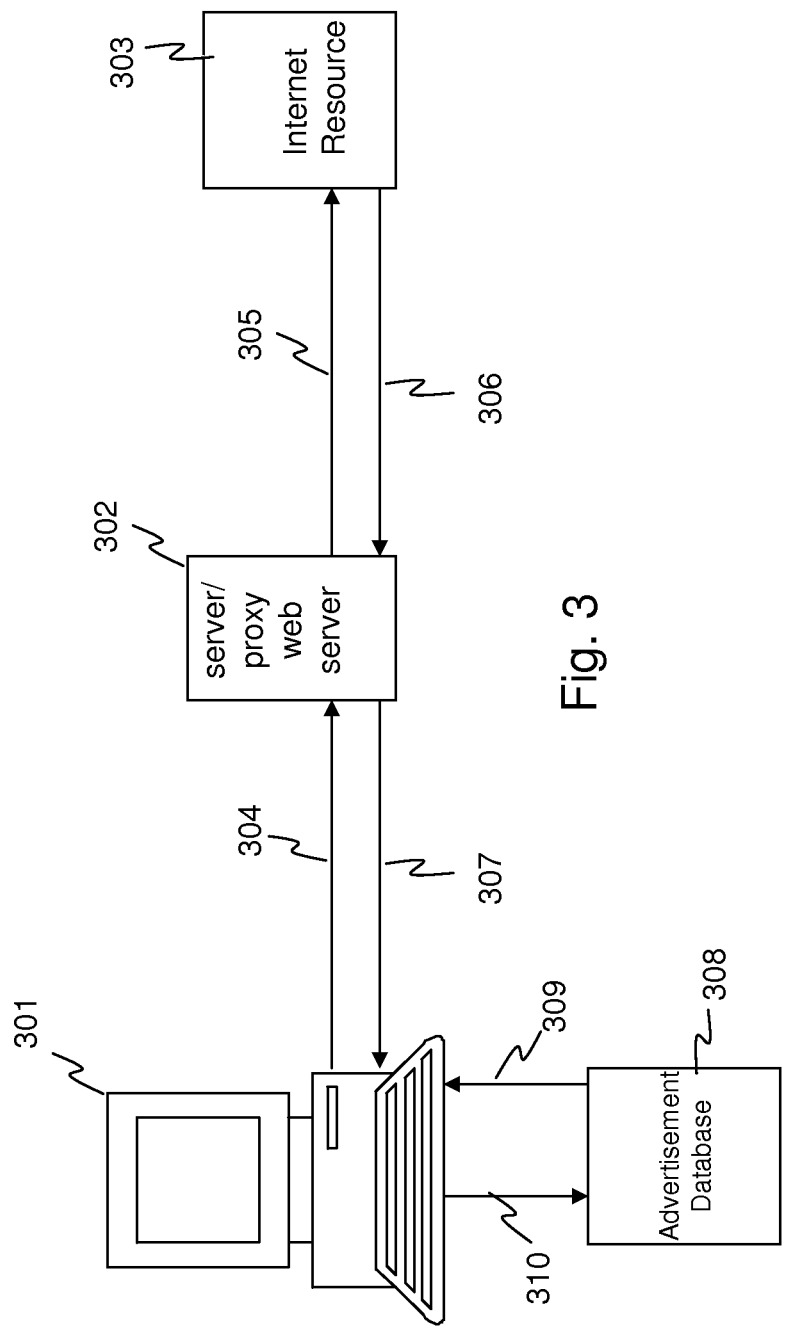
FIG. 3 illustrates an exemplary embodiment of inventive advertising-subsidized system for providing a user with secure Internet experience.

In another embodiment, the inventive system is monetized using advertisements that are inserted into the target content displayed to the user by the inventive browser application. FIG. 3 illustrates an exemplary embodiment of inventive advertising-subsidized system. In an embodiment of the inventive system, the client terminal 301 executes the inventive web browser application (not shown). In one or more embodiments of the inventive system, the server/proxy 302 operates to insert advertisements into every web resource (such as web page) received by the client terminal 301. In one or more embodiment of the inventive system, the server/proxy 302 may either insert actual advertisements or links to advertisements (using, for example, HTML frames) into the content received by the user's terminal 301. In the latter case, the actual advertisements would be downloaded by the user's own web browser from, for example, a designated advertisement server located on the Internet and subsequently inserted into the content viewed by the user.

The user terminal 301 first sends a request 304 to the inventive server/proxy 302 for the Internet resource 303. The request 304 may be sent via a secure HTTPS channel, wherein all the transmitted information is encrypted using, for example SSL encryption protocol. In response to receiving the request 304, the inventive server/proxy 302 sends a request 305 to the Internet resource 303 requested by the user. However, the inventive server/proxy 302 is configured to mask the information identifying the user terminal 301 from the request 305. Such information that is being masked includes, for example, user's IP address. Upon the receipt of the request 305, the Internet resource 303 provides a response 306 to the inventive server/proxy 302. The inventive server/proxy 302, in turn, forwards (307) this response to the client 301 via the secure channel. Because of the presence of the secure channel 304/307 and the masking of the IP address by the inventive server/proxy 302, the Internet resource 303 or any other Internet entity does not detect any information identifying the client terminal 301, which initiated the request. Thus, user's security and anonymity is achieved.

To subsidize the costs of such service, advertisements are shown to the users. In one embodiment, the inventive server/proxy 302 inserts one or more advertisements into the information sent to the user of the user terminal 301. In an embodiment of the invention shown in FIG. 3, the client terminal 301 receives the advertisements to be inserted into the content from the advertisement database 308. To this end, the links to the appropriate advertisements are inserted into the target content by the inventive server/proxy 302.

In one embodiment of the invention, the advertisements served to the users are targeted based on the user's online behavior. To this end, the inventive browser application executing on the client terminal is operable to collect information on the user's online activities and store this information for subsequent use. At the time of the user request 304 or at the time the information 307 is received by the user terminal 301, the software residing on the client terminal 301 may make a determination regarding the nature of the advertisement to be shown to the user. The decision on the type of the advertisement may be based on the user's prior online activities stored at the client terminal 301 as well as the nature of the user's request 304 and/or the nature of the information 307.

Thus, in one embodiment of the invention, all the user-specific information, including the online history of the user is stored only on the client terminal 301 and never on the server 302 or any other server system. Thus, the privacy of the user information is achieved.

Thus, the request 304 to the server/proxy may include information on the type of the advertisement to be provided to the user terminal 301. The information in the advertisement database 308 may be updated periodically in order to ensure that it is up to date. The owner of the inventive service and the advertising database 308 may charge third parties for placing their advertisement into the advertising database 308 and, thereby, subsidize the costs of the inventive secure web browser and associated service.

Figure 4:
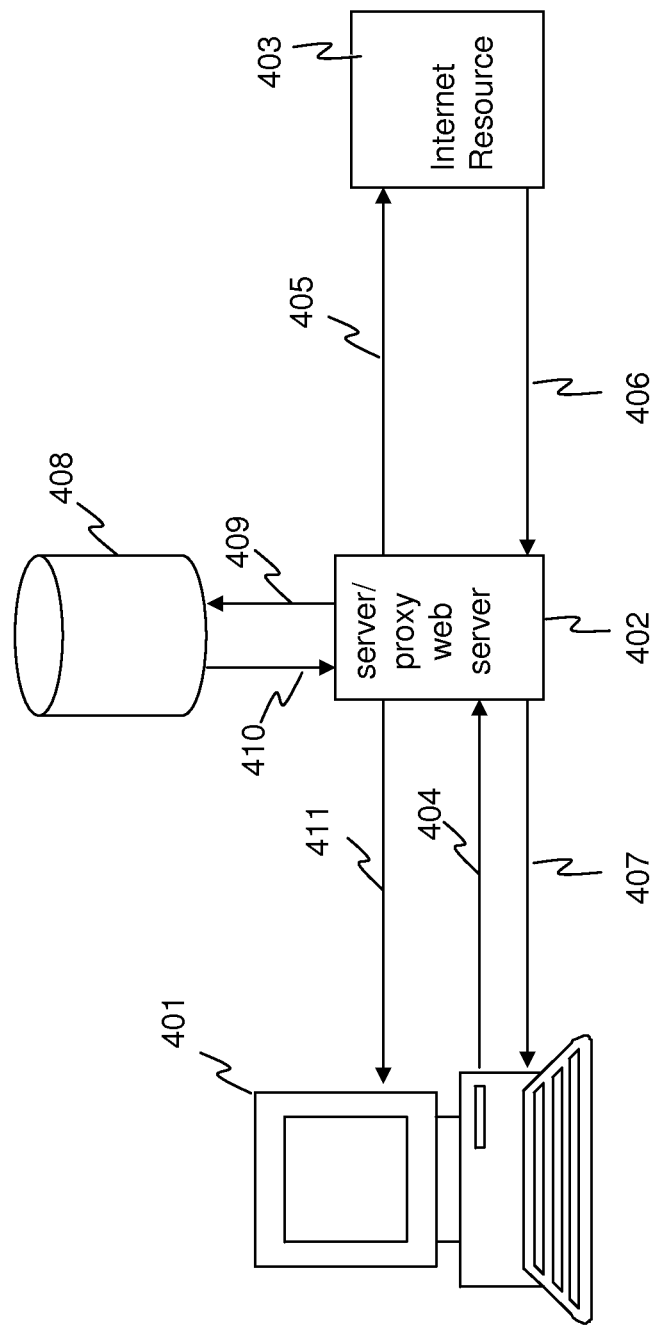
FIG. 4 is a block diagram illustrating another exemplary embodiment of inventive advertising-subsidized system for providing a user with secure Internet experience.

FIG. 4 is a block diagram illustrating another exemplary embodiment of inventive advertising-subsidized web browser system. In this embodiment, the advertising database 408 is coupled with the inventive server/proxy 402, which operates to request an advertisement from the advertising database 408 using a request 409 and to receive the advertisement 410. After that, the inventive server/proxy 402 forwards the received advertisement to the client terminal 402, see 411. In this embodiment, the information specifying the advertisement, which is contained in the request 409 may be provided to the inventive server/proxy 402 by the user terminal 401, being embedded, for example, into the request 404. In another embodiment, the user terminal 401 may send a separate special request to the server/proxy for advertising information (not shown). As in the embodiment shown in FIG. 4, the decision on the type of the advertisement may be based on the user's prior online activities stored at the client terminal 401 as well as the nature of the user's request 404 and/or the nature of the information 407.

In one embodiment, the inventive advertisement sponsored web browser system may utilize the client side user data collection and advertisement insertion algorithm described in detail in U.S. patent publication No. 2006/0265283 A1, incorporated by reference herein in its entirety. In that or another embodiment, the inventive server/proxy may be implemented using one or more features of the networking device with embedded advanced content and web traffic monetization functionality, as described in detail in U.S. patent publication No. 2006/0293962 A1, incorporated by reference herein in its entirety.

In one embodiment of the invention, the user is provided with an ability to select any IP address (from a choice of IP addresses corresponding to multiple counties) through the inventive web browser system, thus enabling the user to choose what region of the world would be reflected his online identity. In the same or another embodiment of the invention, the user may select a language from a predetermined set of world languages that the user prefers or wishes to receive the content in.

The above features of the inventive methodology disrupt the ability of the ISP or governments to block particular Internet sites or online services in a given region, and creates a completely censorship free Internet experience.

In one embodiment of the inventive system, one server with multiple IP addresses is used. The service has at least one proxy server capable of sending requests to the content servers while using any of two or more IP addresses belonging to different countries. In accordance with an embodiment of the inventive concept, the user is able to specify conditions of IP address to use when establishing the tunnel (for instance, country or language) request from the proxy server to the content server is sent while using IP address corresponding to specified conditions.

In accordance with another embodiment of the invention, the inventive system provides advertisement targeting based on the user's IP address selection or language selection. In one embodiment of the invention, the user's language selection is used by the inventive system to choose the language in which the advertisement is presented to the user. In one embodiment of the invention, the user selects different geographical regions (country, zip code or language) to be presented to content providers and advertisers, while real user's geo region remains the same. The ad requests sent to the same database contain different geo region identifiers as selected by the user. The same user, connected to the same proxy server, receives different geo-targeted ads depending on the user's selection of geo region.

Figure 5:
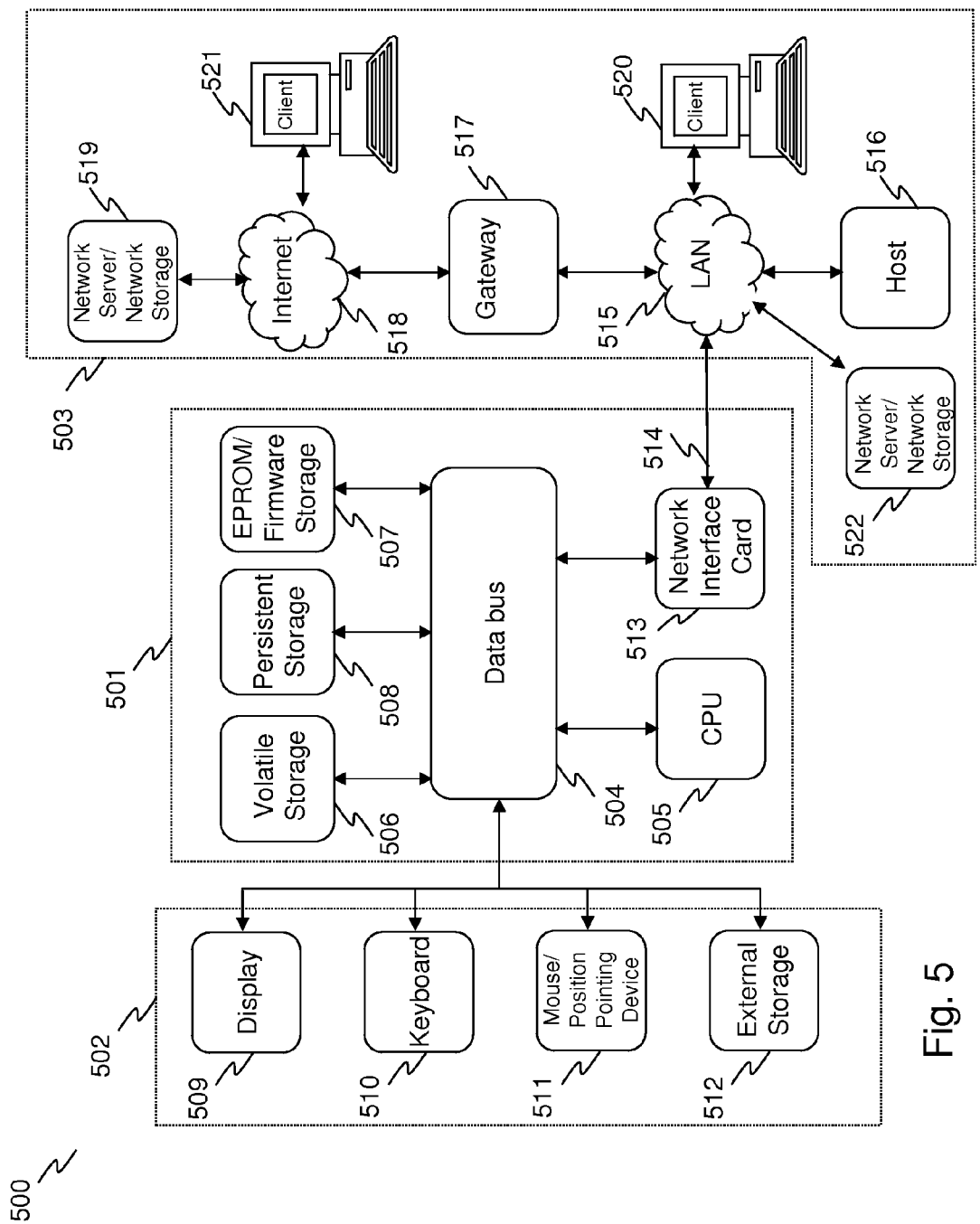
FIG. 5 illustrates an exemplary embodiment of a computer platform upon which the inventive system may be implemented.

FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 505 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 505 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 505 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 505 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 505 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 505. The bus 505 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 505. Communication interface 513 provides a two-way data communication coupling to a network link 515 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 515 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive web browser and associated system and method. It is intended that the specification and examples be considered as exemplary only, with a true scope and spirit of the invention being indicated by the following claims.

What is claimed is:

1. A computerized system comprising:
   a. a proxy server operable to enable a user of a user terminal to retrieve at least one Internet resource specified by the user from a content provider; and
   b. a secure web server communicatively coupled with the proxy server and operable to establish a secure connection with the user terminal executing a secure web browser, and operable to furnish the retrieved Internet resource to the secure web browser executing on the user terminal via a secure data transmission protocol, wherein the secure web browser is configured to perform all its web content access operations through the secure web server, wherein the secure web browser itself is configured to receive requests for web resources directly from the user of the user terminal and automatically convert all the received from the user requests for web resources which would normally be accessed using an unsecure data transmission protocol into the corresponding requests using the secure data transmission protocol and wherein the secure data transmission protocol is an HTTPS protocol.

2. The system of claim 1, wherein a network address of the secure web server is provided to the secure web browser.

3. The system of claim 1, wherein the proxy server is operable to receive a plurality of advertisements from an advertisement module; to choose a most relevant advertisement based on the Internet resource specified by the user; and to insert the most relevant advertisement into the Internet resource provided to the user.

4. The system of claim 1, wherein the proxy server is operable to receive from the user a selection of a geographical region and to alter the user's online identity to reflect an IP address corresponding to the selected geographical region.

5. The system of claim 1, wherein the proxy server is operable to receive from the user selection of a language from a plurality of predetermined languages, wherein the selection of the language indicates preferred content display language of the user and wherein online content of the user defers depending on the language selection.

6. The system of claim 1, wherein the secure web browser is operable to re-write a uniform resource locator corresponding to the at least one Internet resource specified by the user to access the at least one Internet resource through the secure web server and the proxy server.

7. The system of claim 5, wherein the proxy server is operable to receive a plurality of advertisements from an advertisement module; to choose a most relevant advertisement based on the selected geographical region or the user selection of the language; and to insert the most relevant advertisement into the Internet resource provided to the user.

8. A method for providing a user of a user terminal with a secure Internet experience, the method comprising:
   a. using a secure internet browser to receive from a user information on at least one Internet resource;
   b. using a proxy server to enable the user of the user terminal to retrieve the at least one Internet resource specified by the user from a content provider; and
   c. using a secure web server communicatively coupled with the proxy server to establish a secure connection with the user terminal executing the secure web browser and to furnish the retrieved Internet resource to the secure web browser executing on the user terminal via a secure data transmission protocol, wherein the secure web browser is configured to perform all its web content access operations through the secure web server, wherein the secure web browser itself is configured to receive requests for web resources directly from the user of the user terminal and automatically convert all the received from the user requests for web resources which would normally be accessed using an unsecure data transmission protocol into the corresponding requests using the secure data transmission protocol and wherein the secure data transmission protocol is an HTTPS protocol.

9. The method of claim 8, further comprising providing a network address of the secure web server to the secure web browser.

10. The method of claim 8, further comprising using the proxy server to receive a plurality of advertisements from an advertisement module; to choose a most relevant advertisement based on the Internet resource specified by the user; and to insert the most relevant advertisement into the Internet resource provided to the user.

11. The method of claim 8, further comprising using the proxy server to receive from the user a selection of a geographical region and to alter the user's online identity to reflect an IP address corresponding to the selected geographical region.

12. The method of claim 8, further comprising using the proxy server to receive from the user selection of a language from a plurality of predetermined languages, wherein the selection of the language indicates preferred content display language of the user and wherein online content of the user defers depending on the language selection.

13. The method of claim 8, further comprising using the secure web browser to re-write a uniform resource locator corresponding to the at least one Internet resource specified by the user to access the at least one Internet resource through the secure web server and the proxy server.

14. The method of claim 12, further comprising using the proxy server to receive a plurality of advertisements from an advertisement module; to choose a most relevant advertisement based on the selected geographical region or the user selection of the language; and to insert the most relevant advertisement into the Internet resource provided to the user.

15. A non-transitory computer-readable medium embodying a set of instructions, the instructions, when executed by one or more processors cause the one or more processors to perform a method for providing a user of a user terminal with a secure Internet experience, the method comprising:
 a. using a secure internet browser to receive from a user information on at least one Internet resource;
 b. using a proxy server to enable the user of the user terminal to retrieve the at least one Internet resource specified by the user from a content provider; and
 c. using a secure web server communicatively coupled with the proxy server to establish a secure connection with the user terminal executing the secure web browser and to furnish the retrieved Internet resource to the secure web browser executing on the user terminal via a secure data transmission protocol, wherein the secure web browser is configured to perform all its web content access operations through the secure web server, wherein the secure web browser itself is configured to receive requests for web resources directly from the user of the user terminal and automatically convert all the received from the user requests for web resources which would normally be accessed using an unsecure data transmission protocol into the corresponding requests using the secure data transmission protocol and wherein the secure data transmission protocol is an HTTPS protocol.

16. The computer-readable medium of claim 15, wherein the method further comprises providing a network address of the secure web server to the secure web browser.

17. The computer-readable medium of claim 15, wherein the method further comprises using the proxy server to receive a plurality of advertisements from an advertisement module; to choose a most relevant advertisement based on the Internet resource specified by the user; and to insert the most relevant advertisement into the Internet resource provided to the user.

18. The computer-readable medium of claim 15, wherein the method further comprises using the proxy server to receive from the user a selection of a geographical region and to alter the user's online identity to reflect an IP address corresponding to the selected geographical region.

19. The computer-readable medium of claim 15, wherein the method further comprises using the proxy server to receive from the user selection of a language from a plurality of predetermined languages, wherein the selection of the language indicates preferred content display language of the user and wherein online content of the user defers depending on the language selection.

20. The computer-readable medium of claim 15, wherein the method further comprises using the secure web browser to re-write a uniform resource locator corresponding to the at least one Internet resource specified by the user to access the at least one Internet resource through the secure web server and the proxy server.

21. The computer-readable medium of claim 19, wherein the method further comprises using the proxy server to receive a plurality of advertisements from an advertisement module; to choose a most relevant advertisement based on the selected geographical region or the user selection of the language; and to insert the most relevant advertisement into the Internet resource provided to the user.

* * * * *